United States Patent
Majumdar et al.

(10) Patent No.: US 12,192,330 B2
(45) Date of Patent: Jan. 7, 2025

(54) MEDIA ACCESS CONTROL (MAC) SECURITY WITH ASSOCIATION NUMBER FLEXIBILITY

(71) Applicant: Arista Networks, Inc., Santa Clara, CA (US)

(72) Inventors: Kaustav Majumdar, Bengaluru (IN); Manish Singhvi, Bengaluru (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 353 days.

(21) Appl. No.: 17/706,076

(22) Filed: Mar. 28, 2022

(65) Prior Publication Data
US 2023/0308262 A1    Sep. 28, 2023

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/0891* (2013.01); *H04L 9/3242* (2013.01)

(58) Field of Classification Search
CPC ... H04L 9/0825; H04L 9/0861; H04L 9/0891; H04L 9/3242
See application file for complete search history.

(56) References Cited

U.S. PATENT DOCUMENTS

| | | | | |
|---|---|---|---|---|
| 11,539,513 | B1* | 12/2022 | Hussain | H04L 65/1069 |
| 2009/0217032 | A1* | 8/2009 | Guan | H04L 63/08 |
| | | | | 380/279 |
| 2019/0158279 | A1* | 5/2019 | Chimakurthy | H04L 63/0442 |
| 2020/0127987 | A1* | 4/2020 | Sharma | H04L 69/22 |
| 2021/0314351 | A1* | 10/2021 | Mozumdar | H04L 63/0428 |
| 2022/0311615 | A1* | 9/2022 | Gordon | H04L 9/0822 |

OTHER PUBLICATIONS

"Brian Weis", "Security considerations and proposal for MACsec key establishment", "May 15, 2006" (Year: 2006).*

* cited by examiner

*Primary Examiner* — Darshan I Dhruv
(74) *Attorney, Agent, or Firm* — Fountainhead Law Group, PC (57) ABSTRACT

Embodiments allow a network device whose hardware limits an Association Number (AN) to only {0, 1}, to be part of Media Access Control security (MACsec). Upon detecting a network device as being AN-limited, that device's priority value is assigned a maximum value, thereby ensuring election of the AN-limited device as the key server. The {0, 1} AN of the key server is used to generate a Secure Association Key (SAK) used for MACsec. Upon subsequent rekeying, the AN-limited key server automatically cycles to a next AN (either 0 or 1) to generate a new SAK, where that next AN is also recognized by other network devices. In this manner, the AN-limited network device can participate in the MACsec without encountering ANs (e.g., {2, 3}) that it does not recognize.

17 Claims, 6 Drawing Sheets

MEDIA ACCESS CONTROL (MAC) SECURITY WITH ASSOCIATION NUMBER FLEXIBILITY

BACKGROUND

Encryption is an aspect of many network designs, in order to ensure data integrity, as well as confidentiality and defense against potential threats such as replay attacks. Media Access Control security (MACsec) is a security technology that provides secure communication for application traffic on high speed Ethernet links.

MACsec is a link layer encryption for Ethernet. MACsec operates at the link speed of the ports. For switches and routers capable of supporting multiple terabits of throughput, MACsec can provide line rate encryption for secure connections, regardless of packet size, and can scale linearly as it is distributed throughout the device.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

The MACsec protocol provides data security and data integrity among peer members (network devices such as switches, Layer 3 switches, etc.) of a MACsec group. MACsec uses the MACSec Key Agreement (MKA) protocol to create and distribute Secure Association Keys (SAKs).

SAKs are identified by association numbers (ANs) in the MACsec group. A SAK contains cryptographic information for secured transmissions among peers in the MACsec group. A SAK is used to encrypt/decrypt the data.

Typically, a single SAK is in effect at any one time. However, when a SAK needs to be rekeyed, there will be a small window of time where two SAKs are in use for decoding traffic during the rekey process. The AN in a received MACsec data packet informs the receiving peer which SAK to use to decrypt the packet.

Per the IEEE 802.1X-2010 standard, the AN is a two-bit value. So, ordinarily the key server can cycle through values {0, 1, 2, 3} to identify a SAK.

However, the port hardware in certain network devices may limit the AN to just two possible values: {0, 1}. Thus, hardware of such AN-limited network components may be designed to use only a single bit to manage the AN. Where such AN-limited hardware devices encounter more than these two AN values, reliable network operation can be affected.

Accordingly, embodiments impart flexibility for the network to accommodate such devices with limited size of the AN, without disrupting network activity.

In particular, a peer in the MACsec group is elected as the key server. Election of the key server is based on the key server priorities of the respective peers in the MACsec group. Setting the key server priority in a peer to the highest priority can ensure that peer will be elected the key server. Per IEEE 802.1X-2010, key server priority values range from 0-255, with 0 being the highest priority. The default priority value is 16.

In accordance with a first aspect of the disclosure, when a peer network device in a MACsec group detects or otherwise becomes aware that its hardware can only support single-bit ANs, the peer will set its key server priority value to the highest priority. This maximizes the likelihood of the AN-limited peer being elected as the key server.

In accordance with the second aspect of the disclosure, the AN-limited peer, having been elected the key server, now controls the generation and distribution of SAKs and corresponding ANs. That key server can cycle the AN between 0 and 1 with successive SAKs.

Accordingly, when the first SAK is generated, the peer can assign an AN of 0 to the SAK. However, when a rekey operation is initiated, a second SAK is generated.

For a short length of time, both the first and second SAKs will be active, and so the second SAK can be associated with AN=1 in order to distinguish between the first and second SAKs. When the next (third) SAK is generated (e.g., as a result of another rekey operation), the assigned AN becomes 0; the AN alternates between 0 and 1 with each successive new SAK.

Figure 1:
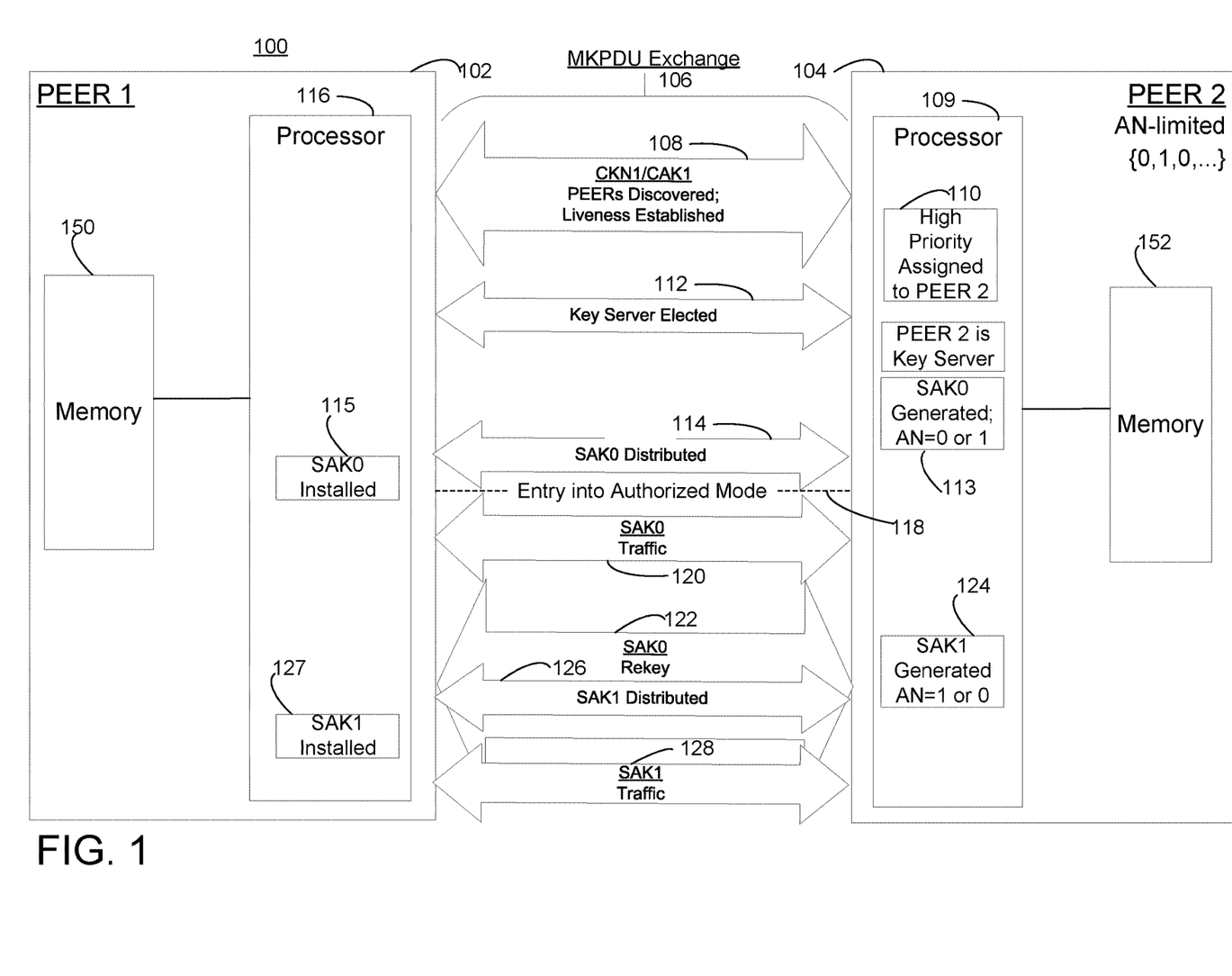
FIG. 1 is a high-level block diagram showing in a system in accordance with the present disclosure.

FIG. 1 shows a simplified view of a system 100 according to an embodiment. In particular, a first network peer device 102 is in communication with a second network peer device 104 via a MACsec protocol to exchange 106 MACsec Key Agreement Protocol Data Units (MKPDUs).

In particular, a protocol data unit (PDU) is a single unit of information transmitted among peer entities of a computer network. A PDU is composed of protocol-specific control information and user data. FIG. 1 is simplified for the purposes of illustration, in that separate transmission (Tx) and receipt (Rx) communications are used to exchange information.

The MKPDUs exchanged are the PDU packets that every MACsec enabled interface sends to its peers. When MKPDU is not received after 3 heartbeats (each heartbeat being 2 seconds), peers are considered to be disconnected.

As part of an initial operation 108, the different peers are discovered, and liveness between the network peers is established. This initial operation may rely upon a first Connectivity Association Key Name (CKN1) and a first Connectivity Association Key (CAK1).

Communication using MACsec requires one peer in the MACsec group to be elected as the key server. Election of the key server is based on the values of the key server priorities of each of the respective peers in the MACsec group.

Each participant in an MKA instance uses the key server priority (an 8-bit integer) encoded in each MKPDU to agree on a key server. Each participant selects the live participant advertising the highest priority as its key server whenever the live peers list changes, provided that highest priority participant has not selected another as its key server or is unwilling to act as the key server. If a key server cannot be selected, SAKs are not distributed.

In the event of a tie for highest priority key server, the MACsec group member with the highest priority Secure Channel Identifier (SCI) may be chosen. To ensure consistency with uses of the SCI's MAC address component other than as a tie-breaker for priority, numerically lower values of the key server priority and SCI are accorded the highest priority.

Setting a peer's key server priority to the highest priority, can ensure that peer's election to be the key server. Thus according to embodiments, when a peer network device in a MACsec group can only support single-bit ANs, processor 109 of that AN-limited peer will assign 110 its key server priority value to the highest priority. This increases the likelihood of the AN-limited peer being elected 112 as the key server.

Having been elected key server, the AN-limited peer controls the generation and distribution of SAKs and corresponding ANs. The AN-limited peer can cycle the AN between 0 and 1 with successive SAKs. Accordingly, when the first SAK is generated 113, the AN-limited peer can assign an AN of 0 to the SAK. The initial SAK0 can then be distributed 114, and installed 115 on the first network peer by the processor 116.

When MACsec is enabled on an interface, the interface moves into an unauthorized mode dropping all frames and accepting only MACsec packets. In this unauthorized mode, the interface is not considered to be a part of any topology. The interface continues in this manner until the MACsec Key Agreement (MKA) procedures are complete.

Once an MKA handshake is concluded, the interface enters an authorized mode 118. The authorized mode permits all packets which pass the integrity and encryption check on that interface to be communicated as traffic 120.

It is recognized that prolonged utilization of the same keys for encryption and decryption can give rise to security vulnerabilities. Accordingly, MACsec employs a periodic rekey operation 122 in order to change the keys between network peers.

When a rekey operation is initiated, a second SAK (SAK1) is generated 124 by the key server. That second SAK is distributed 126 as part of the traffic under the first SAK, and installed 127.

As shown in FIG. 1, for some length of time both the first and second SAKs will be active. So, the second SAK can be associated with a different AN (AN=1) in order to distinguish between the first and second SAKs. That second SAK having the AN=1 is then used to communicate traffic 128 between the network peers.

Eventually, when the next (third) SAK is generated (e.g., as a result of another rekey operation), the assigned AN cycles to value 0 (rather than to value 2). In this manner, according to embodiments the AN alternates between 0 and 1 with each successive new SAK.

While the above has described the existing SAK0 as having a value of 0, this is not required. Under some circumstances, the active SAK could have a value of 1.

According to embodiments, if the active SAK is actually identified using the AN in the sequence, then that AN is skipped and the next AN in the sequence is chosen. By skipping the active AN, the transition to the new Secure Association Key with new AN can be seamless.

Operation ensures that any AN-limited device of the MACsec group is able to function properly. That is, such an AN-limited device of the MACsec group will not encounter ANs having values (e.g., 2 or 3) that it cannot accommodate. Devices that are not AN-limited, will continue to see AN values (0 or 1) lying within the expected set {0, 1, 2, 3}.

FIG. 1 shows processors 116, 109 of network devices 102, 104, as being respectively in communication with memories 150, 152. Those memories can store information relevant to MACsec communication, including but not limited to one or more of:

keys (e.g., SAK, CAK);
AN values;
priority values;
information indicating a network device as being AN-limited.

Embodiments offer the benefit of flexibility to deployment of MACsec on a network. In particular, the network can accommodate the presence of devices that are limited to having an AN with a value of only 0 or 1. This prevents disruption of network operation when such AN-limited devices are present.

Figure 2:
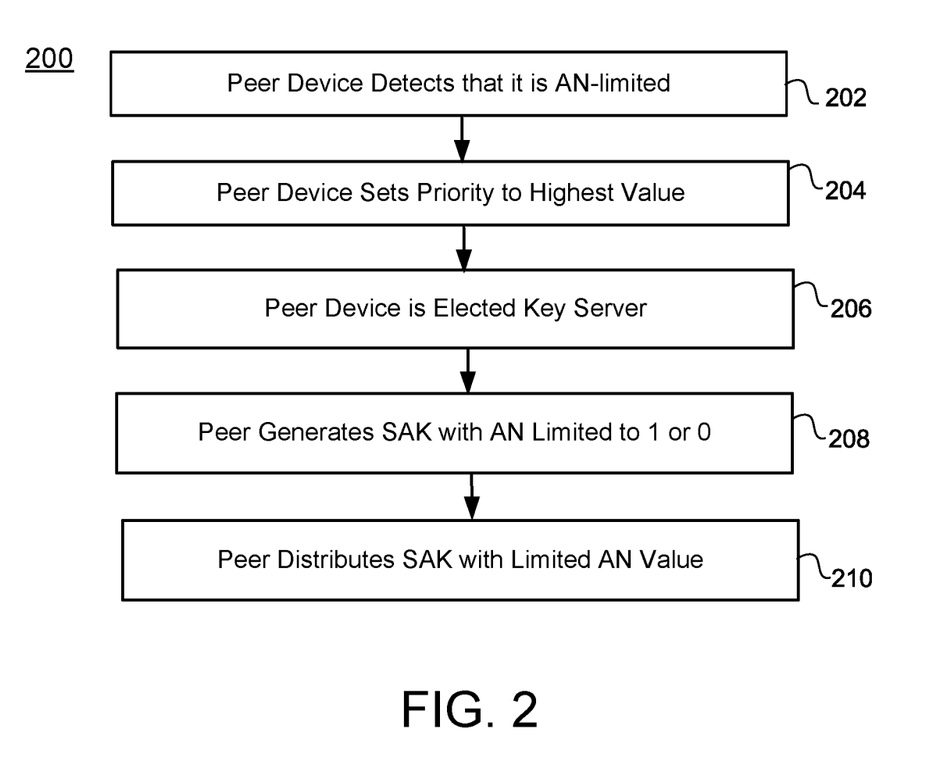
FIG. 2 shows a flow diagram of a method according to an embodiment.

Referring to FIG. 2, the discussion will now turn to a high level description of a processing flow 200 in a node operating as a AN-limited peer. At 202, the peer device detects that it can only support a two-valued {0, 1} AN with which to identify SAKs.

At 204, in response to the detecting, the peer device sets its key server priority value to a highest priority. At 206 the peer device is elected key server because its priority value is set to the highest priority.

At 208, the peer device acting as the key server, generates a sequence of SAKs, wherein each generated SAK is identified by the AN, wherein the AN alternates between the first value and the second value for each SAK in the sequence of SAKs.

At 210, each SAK is distributed and the AN identifies the generated SAK to peers in the MACsec group.

Figure 3:
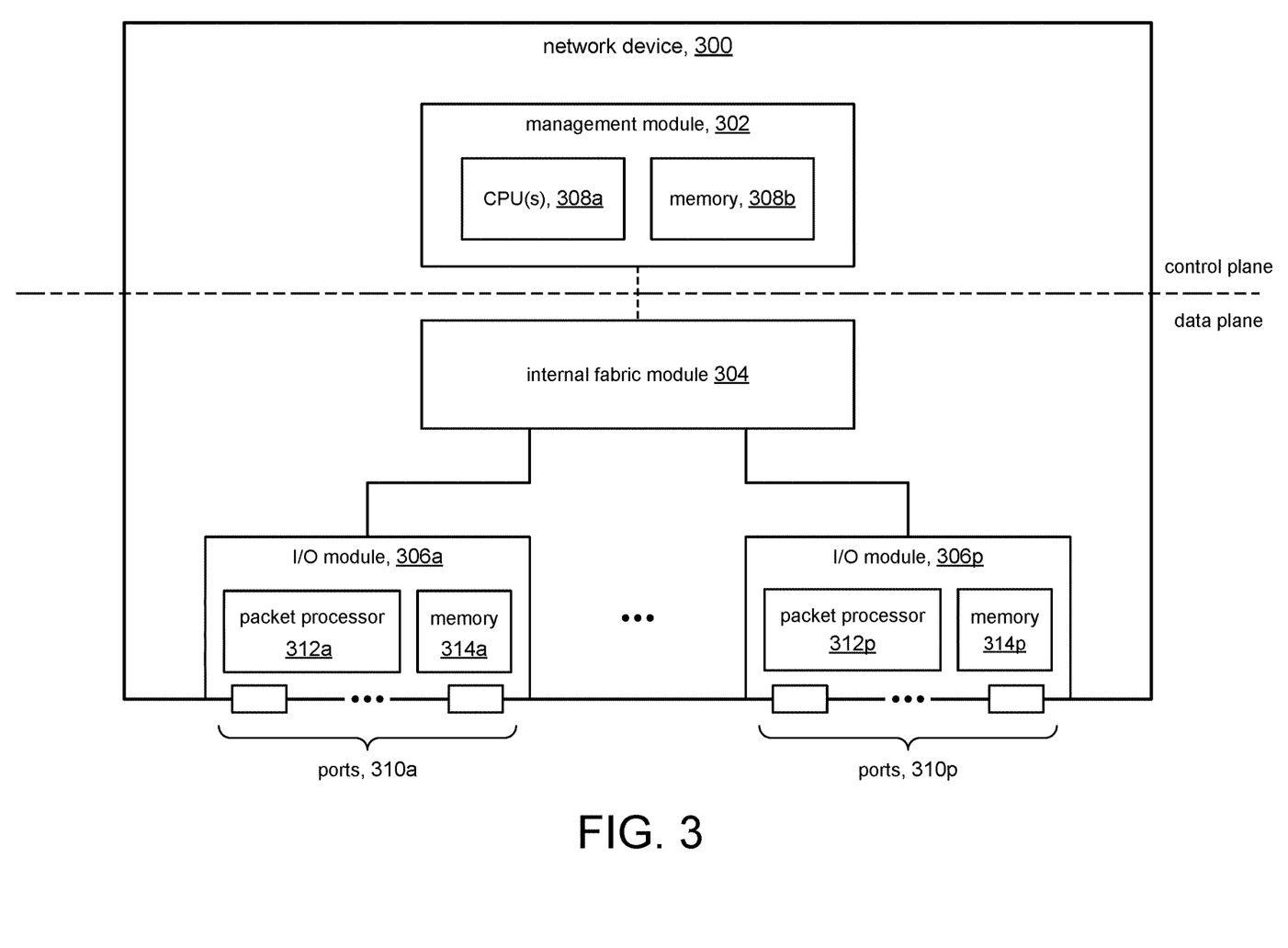
FIG. 3 shows details for a network device as described in the present disclosure.

FIG. 3 depicts an example of a network device 300 (e.g. 102, 104, FIG. 1) in accordance with some embodiments of the present disclosure. As shown, network device 300 includes a management module 302, an internal fabric module 304, and a number of I/O modules 306a-306p. Management module 302 includes the control plane (also referred to as control layer) of network device 300 and can include one or more management CPUs 308a for managing and controlling operation of network device 300 in accordance with the present disclosure. Each management CPU 308a can be a general purpose processor, such as but not limited to an Intel®/AMD® x86 or ARM® processor, that operates under the control of software stored in a memory 308b, such as dynamic random access memory (DRAM).

Control plane refers to all the functions and processes that determine which path to use, such as routing protocols, spanning tree, and the like.

Internal fabric module 304 and I/O modules 306a-306p collectively represent the data plane of network device 300 (also referred to as data layer, forwarding plane, etc.). Internal fabric module 304 is configured to interconnect the various other modules of network device 300. Each I/O module 306a-306p includes one or more input/output ports 310a-310p that are used by network device 300 to send and receive network packets. Each I/O module 306a-306p can also include a packet processor 312a-312p and a respective memory component 314a-314p. Each packet processor 312a-312p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane. In accordance with the present disclosure, the memory components can hold information for MACSec operation, including AN values, priority values, and so on.

Example

Figure 4:
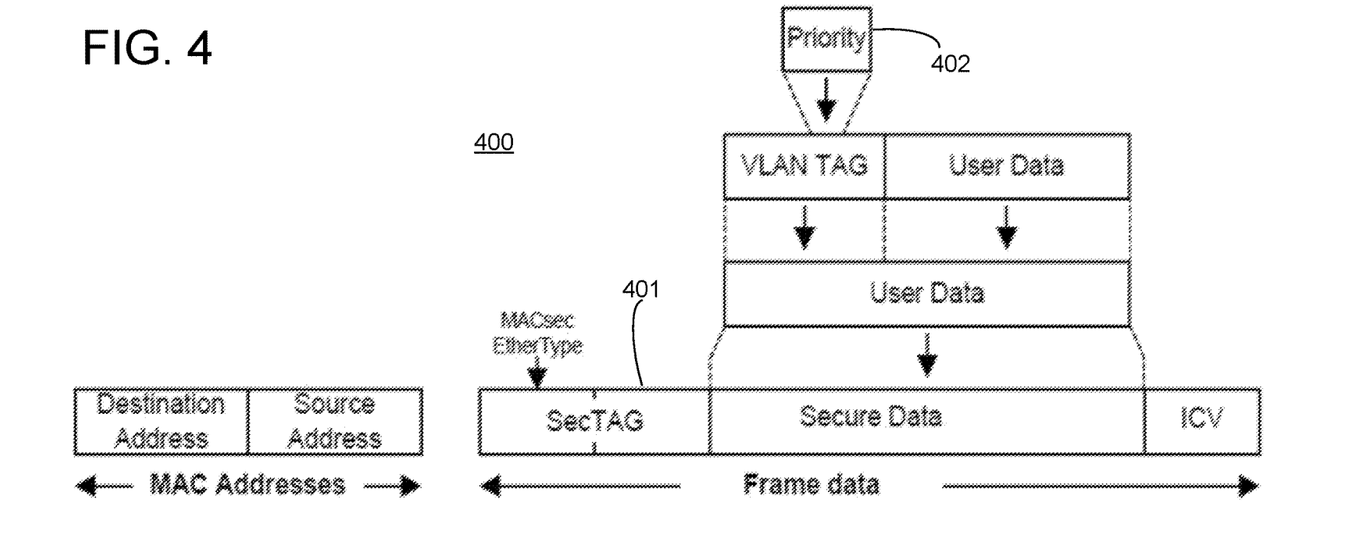
FIG. 4 shows a MACsec data frame.

An example is now described in connection with MACsec implemented with a network device (e.g., switch) available from Arista Networks of Santa Clara, California. FIG. 4 shows a MACsec data frame 400, including a security tag (SecTag) 401.

MACsec uses a key server to generate and distribute encryption parameters and secure key information to members of a MACsec connectivity association. The key server is elected by comparing key-server priority values 402 during MACsec Key Agreement message exchange between peer devices.

The elected key-server is the peer with the lowest configured key-server priority, or with the lowest Secure Channel Identifier (SCI) in case of a tie. Key-server priority may be set to a value from 0 through 255. When no priority is configured, an Arista Network device defaults to a priority of 16.

Figure 5:
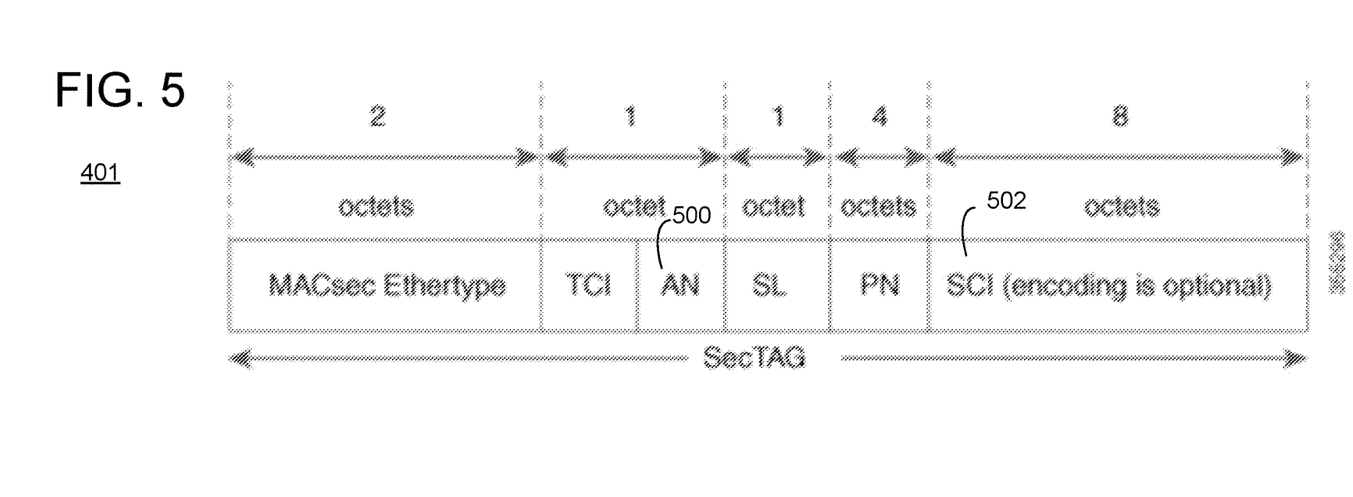
FIG. 5 shows details of a security tag of the MACsec data frame.

FIG. 5 shows various fields of the SecTag 401, including the AN 500 and SCI 502. The SecTag is 8-16 bytes in length. The SecTag identifies the SAK to be used for the frame.

With Secure Channel Identifier encoding, the security tag is 16 bytes in length. SCI encoding is optional, and without that encoding the security tag is 8 bytes in length. The SecTag also provides replay protection when frames are not received in a sequence.

As described previously, embodiments are configured to accommodate the existence of a network component whose hardware limits the AN to having only one bit (e.g., a value of 0 or 1, but not 2 or 3). This is done by setting the AN-limited device's priority to the highest value, thereby ensuring election as key server and thereafter resulting in the AN cycling just as between values of 0 and 1.

Figure 6:
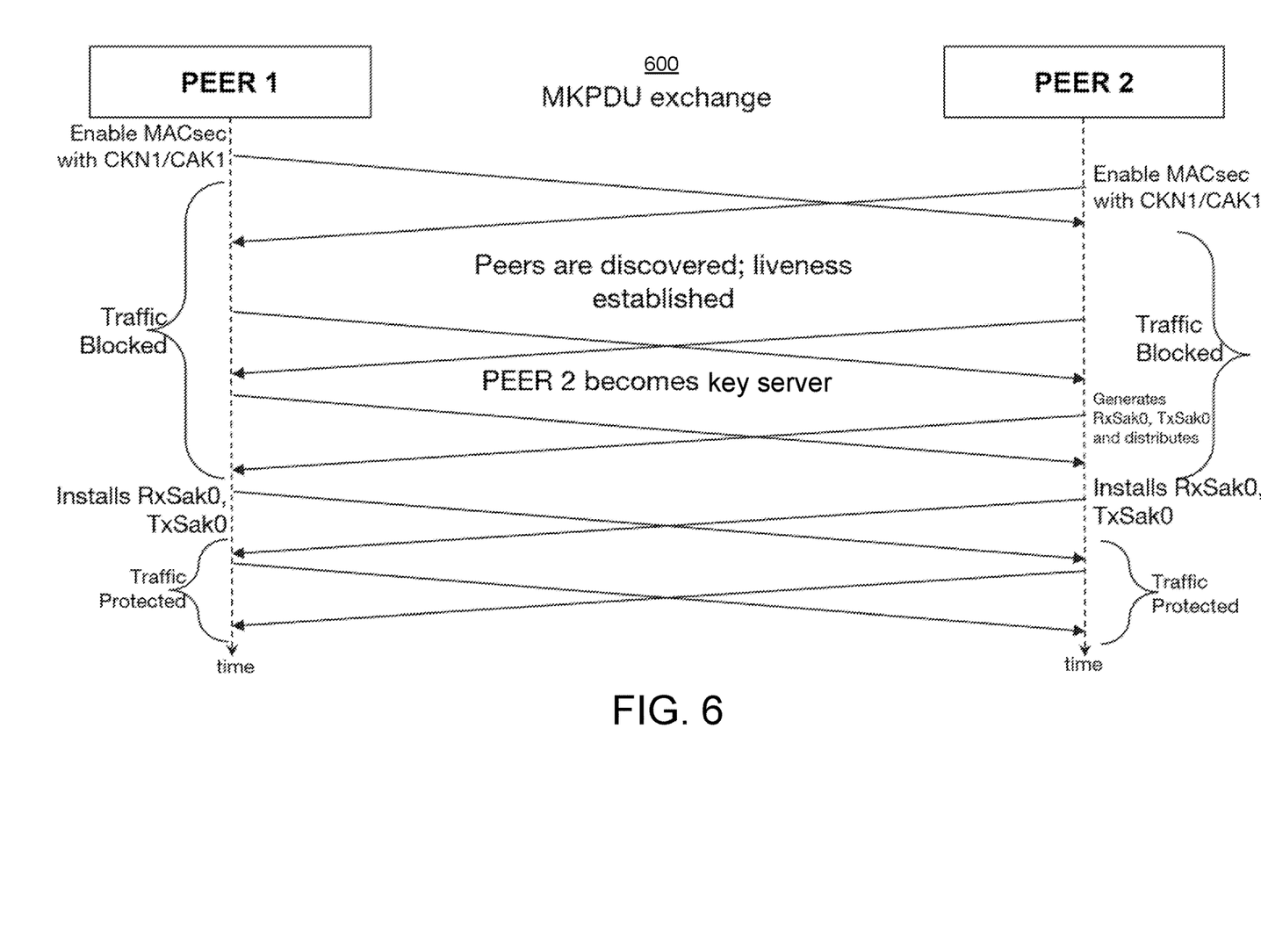
FIG. 6 shows a process flow of a system according to an example.

FIG. 6 shows a process flow of a system according to an example. Here, the separate SAKs are specifically shown for transmission (Tx) and receipt (Rx).

In FIG. 6 and the FIG. 7 described below, RxSak0 and TxSak0 denote the SAK for certain directions. MACSec is symmetric encryption, so the SAK will be same for Rx and Tx.

Figure 7:
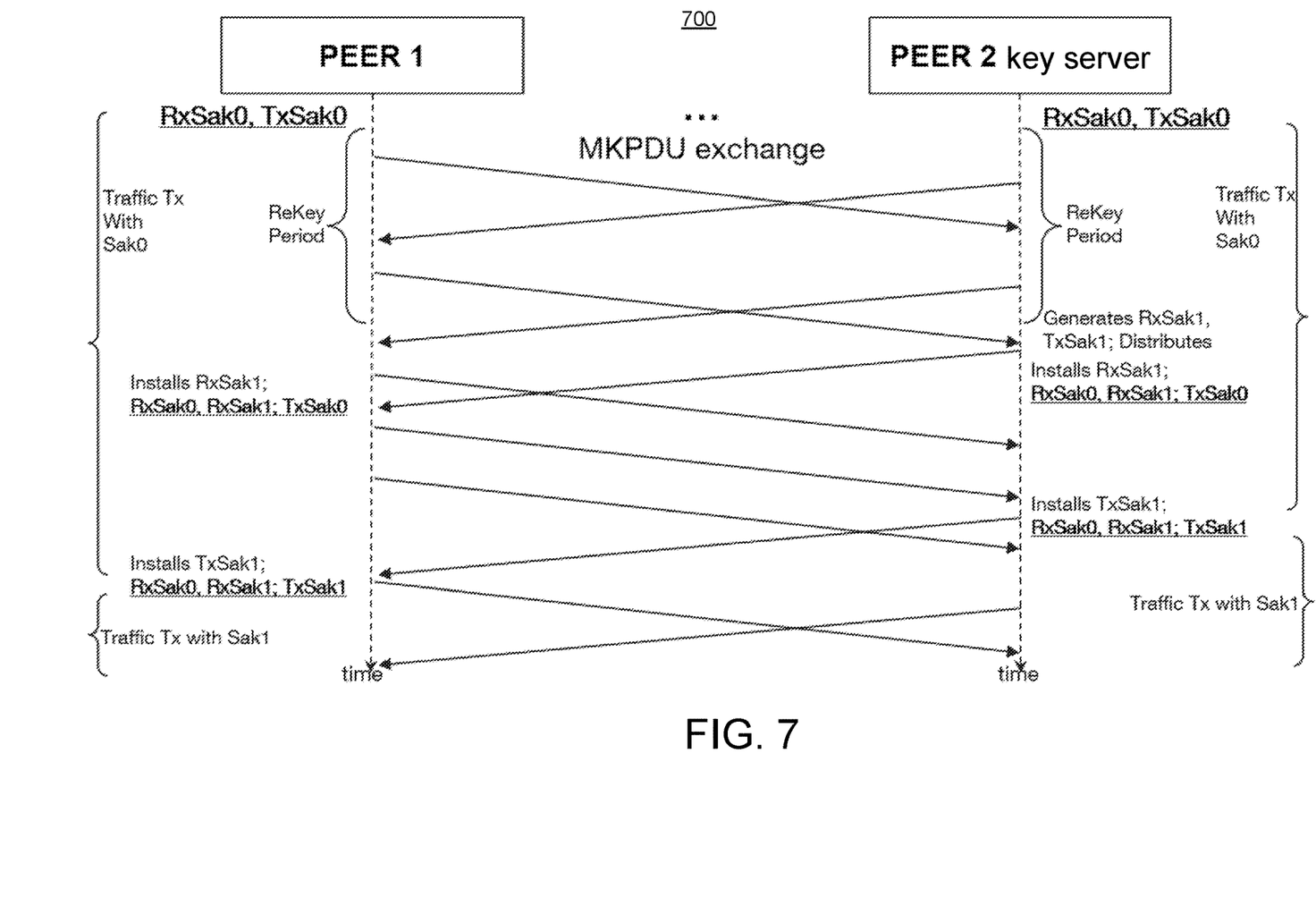
FIG. 7 shows a further process flow of a system according to the example.

FIG. 7 shows a further process flow of a system according to the example. Here, AN-limited PEER 2 is afforded the highest priority value, and is elected key server. As a result, the AN is limited to being one of just two possible values: 0 or 1.

It is noted that upon a SAK rekey event, the SAK is first programmed for Rx on key server, then Rx on non key server, then for Tx on key server and lastly, Tx on non key server. Under some circumstances, a SAK could be programmed for Rx and Tx.

If a subsequent SAK with AN=1 is programmed only for Rx and another SAK needs to be generated, then it can't be generated with AN=0 (as that is already being used for Tx). Accordingly, the new SAK can be generated by skipping to the next AN available (AN=1, for 1 bit AN limitation hardware). It is noted that such AN skipping logic can be applicable to platforms having 2 bit AN capabilities as well.

FURTHER EXAMPLES

In accordance with the present disclosure, a method for a peer device in a MACsec group comprises: the peer device detecting that it can only support a two-valued association number (AN) with which to identify secure association keys (SAKs), wherein the AN can be assigned to only a first value or a second value; in response to the detecting, the peer device setting its key server priority to a highest priority; the peer device participating in a key server election with other peer devices in the MACsec group, wherein the peer device is elected as key server because its key server priority is set to the highest priority; and the peer device, acting as the key server generating a sequence of SAKs, wherein each generated SAK is identified by the AN, wherein the AN alternates between the first value and the second value for each SAK in the sequence of SAKs, and distributing each SAK and the AN that identifies the generated SAK to peers in the MACsec group.

In some embodiments, the method wherein each SAK in the sequence of SAKs is generated and distributed in response to occurrence of a rekey event.

In some embodiments, the method wherein a newly generated SAK in the sequence of SAKs is identified with the AN being set to the second value when a SAK generated immediately prior to the newly generated SAK is identified by the AN being set to the first value, wherein the newly generated SAK is identified with the AN being set to the first value when the SAK generated immediately prior to the newly generated SAK is identified by the AN being set to the second value.

In some embodiments, the method wherein the peer device, acting as the key server: generates a first SAK; distributes both the first SAK and the AN being set to the first value to peers in the MACsec group; generates a second SAK at a time subsequent to distributing the first SAK; distributes both the second SAK and the AN being set to the second value, to the peers in the MACsec group; generates a third SAK at a time subsequent to distributing the second SAK; and distributes both the third SAK and the AN being set to the first value, to peers in the MACsec group.

In some embodiments, the method wherein the second SAK is generated in response to occurrence of a first rekey event, wherein the third SAK is generated in response to occurrence of a second rekey event.

In some embodiments, the method wherein the AN can be set only to '0' or '1'.

In some embodiments, the method wherein the peer device is elected based upon a Secure Channel Identifier (SCI).

In some embodiments, the method further comprising encoding the SCI.

In accordance with the present disclosure, a network device comprises one or more computer processors; and a computer-readable storage medium comprising instructions for controlling the one or more computer processors to: detect that a peer device can only support a two-valued association number (AN) of '0' or '1' with which to identify secure association keys (SAKs), wherein the AN can be assigned to only a first value or a second value; in response to the detecting, set a key server priority of the peer device to a highest priority; cause the peer device to participate in a key server election with other peer devices in the MACsec group, wherein the peer device is elected as key server because its key server priority is set to the highest priority; and cause the peer device, acting as the key server, to generate a sequence of SAKs, wherein each generated SAK is identified by the AN, wherein the AN alternates between the first value and the second value for each SAK in the sequence of SAKs, and distribute each SAK and the AN that identifies the generated SAK to peers in the MACsec group.

In some embodiments, the network device wherein the computer-readable storage medium further comprises instructions for controlling the one or more computer processors to generate and distribute each SAK in the sequence of SAKs in response to occurrence of a rekey event In some embodiments, the network device wherein the computer-readable storage medium further comprises instructions for controlling the one or more computer processors to identify a newly generated SAK in the sequence of SAKs with the AN being set to the second value when a SAK generated immediately prior to the newly generated SAK is identified by the AN being set to the first value, wherein the newly generated SAK is identified with the AN being set to the first value when the SAK generated immediately prior to the newly generated SAK is identified by the AN being set to the second value In some embodiments, the network device wherein the computer-readable storage medium further comprises instructions for controlling the one or more computer processors to cause the peer device, acting as the key server to: generate a first SAK; distribute both the first SAK and the AN being set to the first value to peers in the MACsec group; generate a second SAK at a time subsequent to distributing the first SAK; distribute both the second SAK and the AN being set to the second value, to the peers in the MACsec group; generate a third SAK at a time subsequent to distributing the second SAK; and distribute both the third SAK and the AN being set to the first value, to peers in the MACsec group.

In some embodiments, the network device wherein the computer-readable storage medium further comprises instructions for controlling the one or more computer processors to generate the second SAK in response to occurrence of a first rekey event, wherein the third SAK is generated in response to occurrence of a second rekey event.

In some embodiments, the network device wherein the computer-readable storage medium further comprises instructions for the peer device to be further elected based upon a Secure Channel Identifier (SCI).

In accordance with the present disclosure, a non-transitory machine-readable medium stores a program executable by at least one processing unit of a network device, the program comprising sets of instructions for: detecting that a peer device can only support a two-valued association number (AN) with which to identify secure association keys (SAKs), wherein the AN can be assigned to only a first value or a second value; in response to the detecting, setting the key server priority of the peer device to a highest priority; causing the peer device to participate in a key server election with other peer devices in the MACsec group, wherein the peer device is elected as key server because its key server priority is set to the highest priority; and cause the peer device, acting as the key server to generate a sequence of SAKs, wherein each generated SAK is identified by the AN, wherein the AN alternates between the first value and the second value for each SAK in the sequence of SAKs, and distribute each SAK and the AN that identifies the generated SAK to peers in the MACsec group, wherein each SAK in the sequence of SAKs is generated and distributed in response to occurrence of a rekey event.

In some embodiments, the non-transitory machine-readable medium wherein the AN can be set only to '0' or '1'.

In some embodiments, the non-transitory machine-readable medium wherein a newly generated SAK in the sequence of SAKs is identified with the AN being set to the second value when a SAK generated immediately prior to the newly generated SAK is identified by the AN being set to the first value, wherein the newly generated SAK is identified with the AN being set to the first value when the SAK generated immediately prior to the newly generated SAK is identified by the AN being set to the second value.

In some embodiments, wherein the peer device, acting as the key server: generates a first SAK; distributes both the first SAK and the AN being set to the first value to peers in the MACsec group; generates a second SAK at a time subsequent to distributing the first SAK; distributes both the second SAK and the AN being set to the second value, to the peers in the MACsec group; generates a third SAK at a time subsequent to distributing the second SAK; and distributes both the third SAK and the AN being set to the first value, to peers in the MACsec group.

In some embodiments, the non-transitory machine-readable medium wherein the second SAK is generated in response to occurrence of a first rekey event, wherein the third SAK is generated in response to occurrence of a second rekey event.

In some embodiment, the non-transitory machine-readable medium wherein the peer device is further elected based upon a Secure Channel Identifier (SCI).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed by a peer device in a Media Access Control Security (MACsec) group, the method comprising:
   detecting that the peer device only supports a two-valued association number (AN) with which to identify secure association keys (SAKs), the two-valued AN being either a first value or a second value;

in response to detecting that the peer device only supports the two-valued AN, setting a key server priority of the peer device to a highest priority;
participating in a key server election with other peer devices in the MACsec group; and
while acting as a key server of the MACsec group:
generating a sequence of SAKs, wherein each generated SAK is identified by the two-valued AN, wherein a newly generated SAK in the sequence of SAKs is identified by the two-valued AN being set to the second value when a SAK generated immediately prior to the newly generated SAK is identified by the two-valued AN being set to the first value, and wherein the newly generated SAK is identified by the two-valued AN being set to the first value when the SAK generated immediately prior to the newly generated SAK is identified by the two-valued AN being set to the second value; and
distributing each generated SAK and the two-valued AN that identifies the generated SAK to the other peer devices in the MACsec group.

2. The method of claim 1, wherein each SAK in the sequence of SAKs is generated and distributed in response to occurrence of a rekey event.

3. The method of claim 1, wherein the peer device, acting as the key server:
generates a first SAK;
distributes both the first SAK and the two-valued AN being set to the first value to the other peer devices in the MACsec group;
generates a second SAK at a time subsequent to distributing the first SAK;
distributes both the second SAK and the two-valued AN being set to the second value, to the other peer devices in the MACsec group;
generates a third SAK at a time subsequent to distributing the second SAK; and
distributes both the third SAK and the two-valued AN being set to the first value, to the other peer devices in the MACsec group.

4. The method of claim 3, wherein the second SAK is generated in response to occurrence of a first rekey event, wherein the third SAK is generated in response to occurrence of a second rekey event.

5. The method of claim 1, wherein the first value is '0' and the second value is '1'.

6. The method of claim 1, wherein the peer device is elected as the key server based upon the key server priority.

7. The method of claim 6, wherein election of the peer device as the key server is further based upon a Secure Channel Identifier (SCI).

8. A network device comprising:
one or more hardware processors; and
a computer-readable storage medium comprising instructions for controlling the one or more hardware processors to:
detect that the network device only supports a two-valued association number (AN) of '0' or '1' with which to identify secure association keys (SAKs);
in response to detecting that the network device only supports the two-valued AN, set a key server priority of the network device to a highest priority;
cause the network device to participate in a key server election with other peer devices in a Media Access Control Security (MACsec) group; and
while acting as a key server of the MACsec group:
generate a sequence of SAKs, wherein each generated SAK is identified by the two-valued AN, wherein a newly generated SAK in the sequence of SAKs is identified by the two-valued AN being set to '1' when a SAK generated immediately prior to the newly generated SAK is identified by the two-valued AN being set to '0', and wherein the newly generated SAK is identified by the two-valued AN being set to '0' when the SAK generated immediately prior to the newly generated SAK is identified by the two-valued AN being set to '1'; and
distribute each generated SAK and the two-valued AN that identifies the generated SAK to the other peer devices in the MACsec group.

9. The network device of claim 8, wherein each SAK in the sequence of SAKs is generated and distributed in response to occurrence of a rekey event.

10. The network device of claim 8, wherein the peer device, acting as the key server:
generates a first SAK;
distributes both the first SAK and the two-valued AN being set to the first value to the other peer devices in the MACsec group;
generates a second SAK at a time subsequent to distributing the first SAK;
distributes both the second SAK and the two-valued AN being set to the second value, to the other peer devices in the MACsec group;
generates a third SAK at a time subsequent to distributing the second SAK; and
distributes both the third SAK and the two-valued AN being set to the first value, to the other peer devices in the MACsec group.

11. The network device of claim 10, wherein the second SAK is generated in response to occurrence of a first rekey event, wherein the third SAK is generated in response to occurrence of a second rekey event.

12. The network device of claim 8, wherein the peer device is elected as the key server based upon the key server priority.

13. A non-transitory machine-readable medium storing a program executable by at least one processing unit of a network device, the program comprising sets of instructions for:
detecting that the network device only supports a two-valued association number (AN) with which to identify secure association keys (SAKs), the two-valued AN being only a first value or a second value;
in response to detecting that the network device only supports the two-valued AN, setting a key server priority of the network device to a highest priority;
participating in a key server election with other peer devices in a Media Access Control Security (MACsec) group; and
while acting as a key server of the MACsec group:
generating a sequence of SAKs, wherein each generated SAK is identified by the two-valued AN, wherein a newly generated SAK in the sequence of SAKs is identified by the two-valued AN being set to the second value when a SAK generated immediately prior to the newly generated SAK is identified by the two-valued AN being set to the first value, and wherein the newly generated SAK is identified by the two-valued AN being set to the first value when the SAK generated immediately prior to the newly generated SAK is identified by the two-valued AN being set to the second value; and distributing each generated SAK and the two-valued AN that identifies the generated SAK to the other peer devices in the MACsec group, wherein each SAK in the sequence of SAKs is generated and distributed in response to occurrence of a rekey event.

14. The non-transitory machine-readable medium of claim 13, wherein the first value is '0' and the second value is '1'.

15. The non-transitory machine-readable medium of claim 1, wherein the peer device, acting as the key server:
generates a first SAK;
distributes both the first SAK and the two-valued AN being set to the first value to the other peer devices in the MACsec group;
generates a second SAK at a time subsequent to distributing the first SAK;

distributes both the second SAK and the two-valued AN being set to the second value, to the other peer devices in the MACsec group;

generates a third SAK at a time subsequent to distributing the second SAK; and distributes both the third SAK and the two-valued AN being set to the first value, to the other peer devices in the MACsec group.

16. The non-transitory machine-readable medium of claim 15, wherein the second SAK is generated in response to occurrence of a first rekey event, wherein the third SAK is generated in response to occurrence of a second rekey event.

17. The non-transitory machine-readable medium of claim 13, wherein the peer device is elected as the key server based upon the key server priority.

\* \* \* \* \*